(12) United States Patent
Kobielski et al.

(10) Patent No.: US 11,821,441 B2
(45) Date of Patent: Nov. 21, 2023

(54) SYSTEM FOR A COMBINED TURBINE AND BEARING CASE FOR A TURBOCHARGER

(71) Applicant: Transportation IP Holdings, LLC, Norwalk, CT (US)

(72) Inventors: Louis Kobielski, Sherman, NY (US); Baris Uygun, Erie, PA (US); Adam Felton, Grove City, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 208 days.

(21) Appl. No.: 16/520,268

(22) Filed: Jul. 23, 2019

(65) Prior Publication Data

US 2021/0025405 A1 Jan. 28, 2021

(51) Int. Cl.
| | |
|---|---|
| *F04D 29/58* | (2006.01) |
| *F04D 29/056* | (2006.01) |
| *F04D 29/40* | (2006.01) |
| *F02B 37/00* | (2006.01) |

(52) U.S. Cl.
CPC ............ *F04D 29/584* (2013.01); *F02B 37/00* (2013.01); *F04D 29/056* (2013.01); *F04D 29/403* (2013.01); *F05D 2230/31* (2013.01); *F05D 2250/25* (2013.01); *F05D 2260/22141* (2013.01); *F05D 2260/231* (2013.01)

(58) Field of Classification Search
CPC .... F04D 29/584; F04D 29/056; F04D 29/403; F02B 37/00; B22F 2999/00; B22F 5/009; B33Y 80/00; Y02T 10/12; F05D 2230/31; F05D 2260/231; F05D 2260/22141; F05D 2260/232; F05D 2250/25; F05D 2220/40; F01D 25/14; F02C 6/12
See application file for complete search history.

(56) References Cited

U.S. PATENT DOCUMENTS

| | | | | |
|---|---|---|---|---|
| 10,527,359 | B1* | 1/2020 | Roper | F28F 3/00 |
| 2006/0010864 | A1* | 1/2006 | Mulloy | F01D 17/167 |
| | | | | 60/602 |
| 2008/0075912 | A1* | 3/2008 | Malinek | F16L 59/02 |
| | | | | 428/68 |
| 2011/0262695 | A1* | 10/2011 | Lee | F01D 5/184 |
| | | | | 428/131 |
| 2015/0056065 | A1* | 2/2015 | Takama | F04D 29/023 |
| | | | | 415/119 |
| 2015/0322850 | A1* | 11/2015 | Vardhana | F01D 15/02 |
| | | | | 415/177 |
| 2015/0377064 | A1* | 12/2015 | Celaya | F02C 6/12 |
| | | | | 415/1 |
| 2016/0069208 | A1* | 3/2016 | Parker | F02C 6/12 |
| | | | | 415/9 |
| 2017/0363007 | A1* | 12/2017 | Xu | F01D 25/30 |
| 2018/0156064 | A1* | 6/2018 | Han | C23C 28/36 |

(Continued)

*Primary Examiner* — Charles G Freay
*Assistant Examiner* — Lilya Pekarskaya
(74) *Attorney, Agent, or Firm* — McCoy Russell LLP

(57) ABSTRACT

Various systems are provided for a single turbocharger case housing each of turbine of a turbocharger and a bearing of the turbocharger. In one example, an apparatus for an engine includes an integrated, monolithic turbocharger case that houses each of a turbine and a bearing of a turbocharger and a nozzle ring integrated into the turbocharger case between the turbine and the bearing. In further examples of the system, portions of the turbocharger case are formed of a lattice structure.

17 Claims, 5 Drawing Sheets

(56) References Cited

U.S. PATENT DOCUMENTS

| | | | |
|---|---|---|---|
| 2019/0271237 A1* | 9/2019 | Martin | B32B 3/12 |
| 2020/0018270 A1* | 1/2020 | Friske | B22F 3/1118 |
| 2020/0173452 A1* | 6/2020 | Igarashi | F01D 25/26 |

* cited by examiner

SYSTEM FOR A COMBINED TURBINE AND BEARING CASE FOR A TURBOCHARGER

BACKGROUND

Technical Field

Embodiments of the subject matter disclosed herein relate to a single case for housing a turbine and one or more bearings of a turbocharger for an engine.

Discussion of Art

Engine systems may be equipped with a turbocharger, which may allow an engine to receive boost air during some engine operating parameters to increase power output and fuel efficiency. Vanes and other similar components may be arranged in a nozzle of a turbine of the turbocharger to adjust the turbine geometry. Adjustable turbine geometry may accelerate exhaust gas therein to increase a turbine speed and increase boost.

Current turbocharger cases have separate cases for the turbine, the bearing(s), and the compressor, where adjoining cases are coupled via clamping arrangements and/or bolted joints. However, the coupling of the separate cases presents some problems, including reliability and maintenance difficulties such as joint degradation which may cause water leakage. Thermal stress may occur at a joint of the turbine case and the bearing case when subjected to temperature gradients during operation of the turbocharger, which causes the case to be further degraded at the joints Based on configuration of the case, a turbocharger may include a water cooling system for mitigating heat transfer within the cases and from the turbine to a bearing or a compressor.

BRIEF DESCRIPTION

In one embodiment, an apparatus for an engine includes an integrated, monolithic turbocharger case that houses each of a turbine of a turbocharger and a bearing of the turbocharger, the turbocharger case having a thickness and one or more regions of the turbocharger case within the thickness defining a lattice structure, and a nozzle ring integrated into the turbocharger case and located between the turbine and the bearing

DETAILED DESCRIPTION

The following description relates to embodiments of a system for an engine including a turbocharger. The turbocharger may include a single case that encapsulates each of a turbine wheel and one or more bearings, but without any joints and/or seams. By eliminating joints and using a single, monolithic and/or seamless case for enclosing the turbine and the bearing(s) as described herein, buildup of thermal stresses at the turbocharger case may be controlled or reduced, thereby improving robustness of the turbocharger assembly. A printed-in nozzle ring may be incorporated between the turbine and the bearing with one end coupled to the case surrounding the turbocharger, thereby eliminating another hot joint.

At least portions of the turbocharger case may include a grid like lattice structure to improve structural integrity and heat transfer while reducing weight of the structure. A targeted water cooling system provides cooling to the turbocharger system, thereby reducing any temperature gradients formed between components. Also, a thermal isolation layer between the turbine and the bearing reduces the temperature gradient between the two components and allows the turbine case to be combined with the bearing case.

Figure 1:
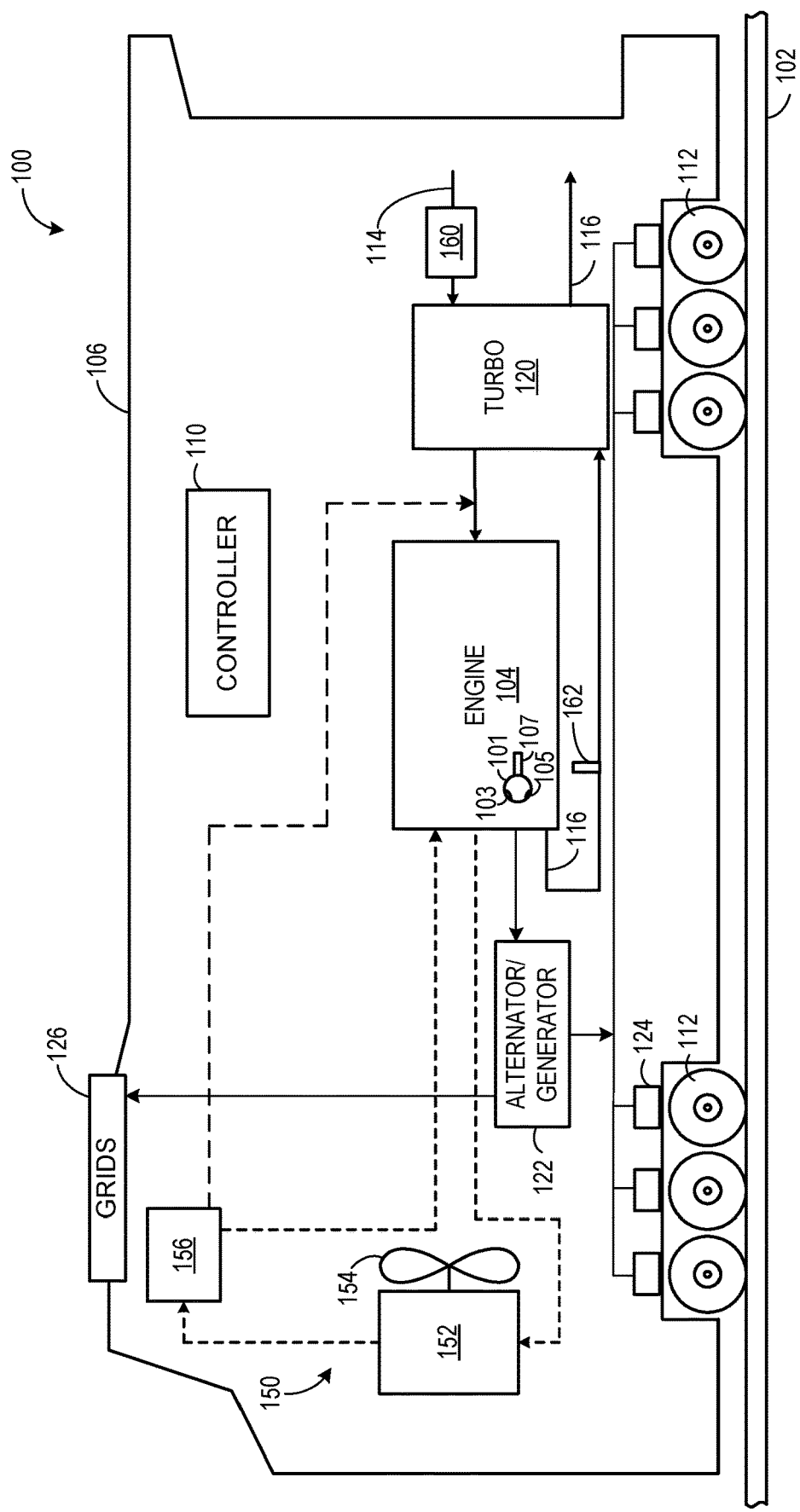
FIG. 1 shows a schematic diagram of a vehicle with an engine comprising a turbocharger arrangement, according to an embodiment of the present disclosure.
Figure 2:
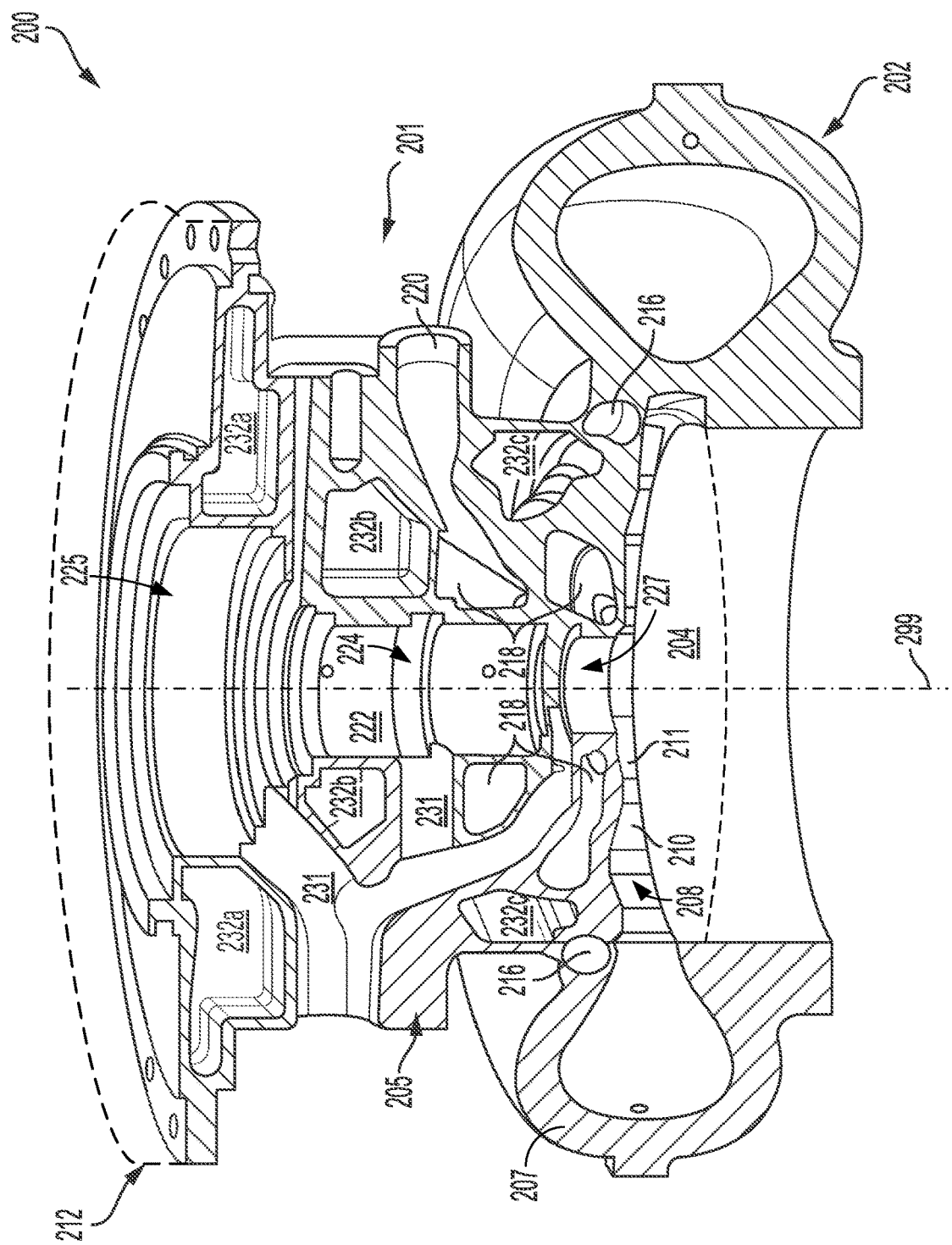
FIG. 2 shows a cross-section view of an example turbocharger arrangement including a single case enclosing a turbine and one or more bearings.
Figure 3:
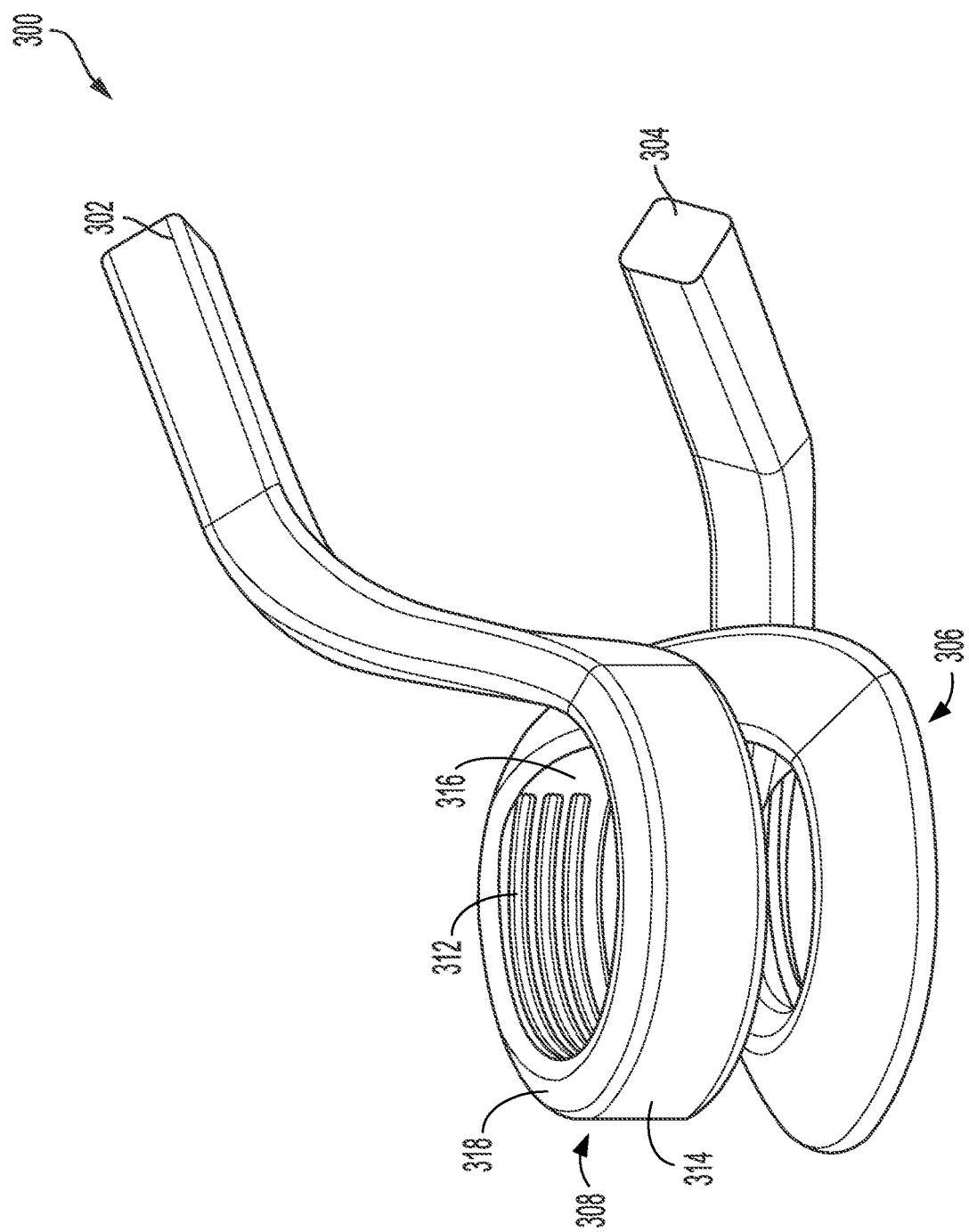
FIG. 3 shows a water cooling core for a turbocharger.
Figure 4C:
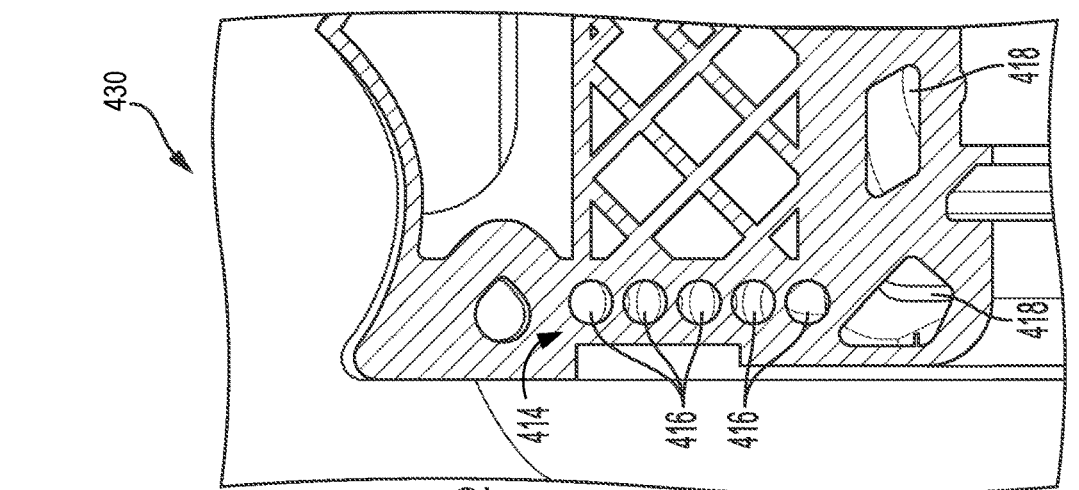
FIG. 4C shows a detailed view of a thermal isolation layer in the turbocharger arrangement of FIG. 4B.
Figure 4B:
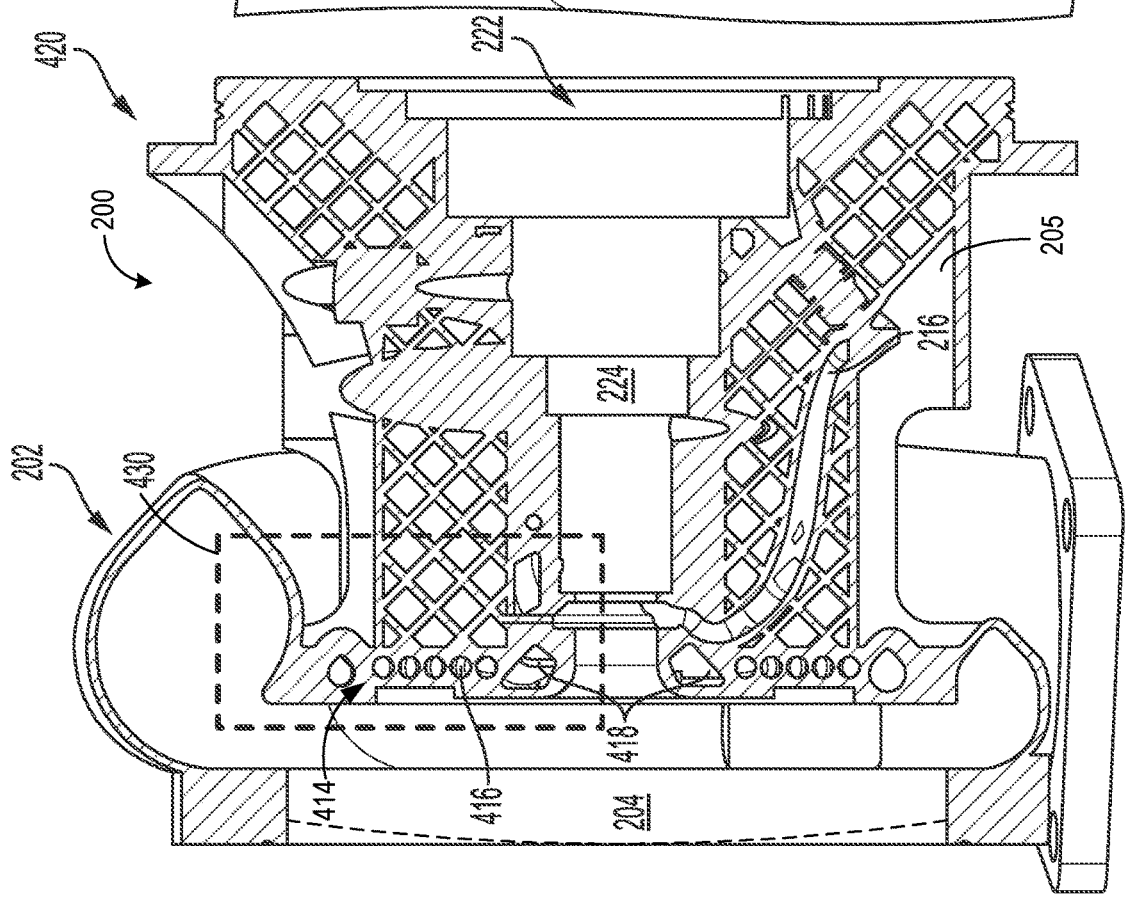
FIG. 4B shows a further cross-sectional view of the turbocharger arrangement of FIG. 2.
Figure 4A:
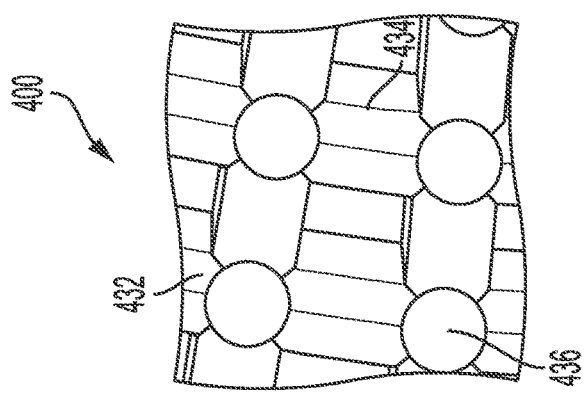
FIG. 4A shows a lattice structure incorporated within at least portions of the case of FIG. 2.

In one example, the turbocharger turbine receives exhaust gas from an engine of a vehicle as shown in FIG. 1. Turbocharger components including a turbine wheel and one or more bearings may be encapsulated within a single, seamless, case, as shown in FIGS. 2 and 4B. A thermal isolation barrier, as shown in FIGS. 4B-4C may be present between the turbine and a bearing to reduce heat transfer from the heated turbine components to the bearing. In one embodiment, at least parts of the turbocharger case may include a lattice structure, as shown in FIG. 4A. A spiral water cooling core, as shown in FIG. 3, may circulate cooling liquid through turbocharger components for dissipation of heat and reduction of temperature gradients between adjacent components.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, mining equipment, marine vessels, rail vehicles, and other off-highway vehicles (OHV). For clarity of illustration, a locomotive may be provided as an example of a mobile platform supporting a system incorporating an embodiment of the disclosure.

FIGS. 1-4C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2-4C are drawn approximately to scale, although other dimensions or relative dimensions may be used.

FIG. 1 shows an embodiment of a system in which a turbocharger arrangement may be installed. Specifically, FIG. 1 shows a block diagram of an embodiment of a vehicle system 100, herein depicted as a rail vehicle 106 (e.g., locomotive), configured to run on a rail 102 via a plurality of wheels 112. As depicted, the rail vehicle 106 includes an engine 104. The engine includes a plurality of cylinders 101 (only one representative cylinder shown in FIG. 1) that each include at least one intake valve 103, exhaust valve 105, and fuel injector 107. Each intake valve, exhaust valve, and fuel injector may include an actuator that may be actuated via a signal from a controller 110 of the engine 104. In other non-limiting embodiments, the engine 104 may be a stationary engine, such as in a power-plant application, or an engine in a marine vessel or other off-highway vehicle propulsion system as noted above.

The engine receives intake air for combustion from an intake passage 114. The intake passage comprises an air filter 160 that filters air from outside of the rail vehicle. Exhaust gas resulting from combustion in the engine is supplied to an exhaust passage 116. Exhaust gas flows through the exhaust passage, and out of an exhaust stack of the rail vehicle. In one example, the engine is a diesel engine that combusts air and diesel fuel through compression ignition. In another example, the engine is a dual or multi-fuel engine that may combust a mixture of gaseous fuel and air upon injection of diesel fuel during compression of the air-gaseous fuel mix. In other non-limiting embodiments, the engine may additionally combust fuel including gasoline, kerosene, natural gas, biodiesel, or other petroleum distillates of similar density through compression ignition (and/or spark ignition).

In one embodiment, the rail vehicle is a diesel-electric vehicle. As depicted in FIG. 1, the engine is coupled to an electric power generation system, which includes an alternator/generator 122 and electric traction motors 124. For example, the engine is a diesel and/or natural gas engine that generates a torque output that is transmitted to the alternator/generator which is mechanically coupled to the engine. In one embodiment herein, the engine is a multi-fuel engine operating with diesel fuel and natural gas, but in other examples the engine may use various combinations of fuels other than diesel and natural gas.

The alternator/generator 122 produces electrical power that may be stored and applied for subsequent propagation to a variety of downstream electrical components. As an example, the alternator/generator 122 may be electrically coupled to a plurality of traction motors and the alternator/generator may provide electrical power to the plurality of traction motors. As depicted, each of the plurality of traction motors is connected to one of the plurality of wheels to provide tractive power to propel the rail vehicle. One example configuration includes one traction motor per wheel set. As depicted herein, six traction motors correspond to each of six pairs of motive wheels of the rail vehicle. In another example, alternator/generator may be coupled to one or more resistive grids 126. The resistive grids may be configured to dissipate excess engine torque via heat produced by the grids from electricity generated by alternator/generator.

In some embodiments, the vehicle system may include a turbocharger 120 that is arranged between the intake passage and the exhaust passage. The turbocharger increases air charge of ambient air drawn into the intake passage in order to provide greater charge density during combustion to increase power output and/or engine-operating efficiency. The turbocharger may include at least one compressor (not shown) which is at least partially driven by at least one corresponding turbine (not shown). In some embodiments, the vehicle system may further include an aftertreatment system coupled in the exhaust passage upstream and/or downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, $NO_x$ trap, or various other devices or exhaust aftertreatment systems.

As depicted in FIG. 1, the vehicle system further includes a cooling system 150 (e.g., engine cooling system). The cooling system circulates coolant through the engine to absorb waste engine heat and distribute the heated coolant to a heat exchanger, such as a radiator 152 (e.g., radiator heat exchanger). In one example, the coolant may be water. A fan 154 may be coupled to the radiator in order to maintain an airflow through the radiator when the vehicle is moving slowly or stopped while the engine is running. In some examples, fan speed may be controlled by the controller. Coolant which is cooled by the radiator may enter a tank (not shown). The coolant may then be pumped by a water, or coolant, pump 156 back to the engine or to another component of the vehicle system.

The controller 110 may be configured to control various components related to the rail vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of rail vehicle operation. In some examples, the controller may include more than one controller each in communication with one another, such as a first controller to control the engine and a second controller to control other operating parameters of the locomotive (such as tractive motor load, blower speed, etc.). The first controller may be configured to control various actuators based on output received from the second controller and/or the second controller may be configured to control various actuators based on output received from the first controller.

The controller may receive information from a plurality of sensors and may send control signals to a plurality of actuators. The controller, while overseeing control and management of the engine and/or rail vehicle, may be configured to receive signals from a variety of engine sensors, as further elaborated herein, in order to determine operating parameters and operating conditions, and correspondingly adjust various engine actuators to control operation of the engine and/or rail vehicle. For example, the engine controller may receive signals from various engine sensors including, but not limited to, engine speed, engine load, intake manifold air pressure, boost pressure, exhaust pressure, ambient pressure, ambient temperature, exhaust temperature, particulate filter temperature, particulate filter back pressure, engine coolant pressure, or the like. Additional sensors, such as coolant temperature sensors, may be positioned in the cooling system. Correspondingly, the controller may control the engine and/or the rail vehicle by sending commands to various components such as the traction motors, the alternator/generator, fuel injectors, valves (e.g., coolant and/or EGR cooler valve), coolant pump, or the like. For example, the controller may control the operation of a restrictive element (e.g., such as a valve) in the engine cooling system. Other actuators may be coupled to various locations in the rail vehicle.

Herein, description is directed to a turbine of a turbocharger, such as turbocharger 120 shown in FIG. 1, which may be a variable geometry turbine, wherein a throat area of the turbine may be adjusted based on engine conditions. In one example, the engine condition is an engine power level (e.g., notch level) and/or an engine load. As the engine power level decreases, it may be desired to decrease a throat area of the turbine.

In one example, variable geometry turbines may include mechanically movable vanes or stationary vanes with a movable component such as a shroud or other similar device. By moving the vanes or an adjacent component, a throat area of the turbine is adjusted to adjust a speed of airflow through the turbine and increase boost provided by a current level of exhaust gas production. In another example, a plurality of stationary nozzle vanes in a turbine may inject various amounts of air into the turbine nozzle to adjust a throat area of the nozzle through fluidic blocking. A flow control system outside of the turbine may be arranged for the stationary nozzle vanes inside of the turbine. For example, such a system may reduce a number of mechanical components within the turbine. Additionally, the nozzle vanes and flow control system may provide a greater degree of control over adjusting the area of the turbine such that a greater range of boost may be achieved.

Some turbochargers may comprise a turbine case housing a turbine wheel, a compressor case housing a compressor wheel, and a bearing case surrounding a shaft and associated bearings connecting the turbine wheel to the compressor wheel and arranged between the turbine case and compressor case. A plurality of bolts may mutually couple the turbine case, the compressor case, and the bearing case. However, such discrete cases may have shortcomings. For example, during turbocharger operation, due to unequal heating of the turbine components (the turbine expanding more than a bearing), thermal stress may be generated at the joint between the turbine case and the bearing case. Such thermal stresses may cause mechanical degradation of the joints, thereby creating leaks in the turbocharger system. Additionally, manufacture of such separate cases may be cumbersome as multiple components are to be manufactured and a plurality of tools are required for coupling the individual cases, thereby increasing production complexity. In one example, the disclosure addresses the above-described issues with a single, combined turbocharger case that may encapsulate the turbine wheel and the bearing without any hot joints and/or seams. A nozzle ring with vanes may be integrated with the case to further decrease the number of individual components. A targeted water cooling system with a plurality of fluidic passages may be disposed across the case to provide cooling to areas of the case that may be exposed to temperature gradients during turbocharger operation.

Turning now to FIG. 2, a first partial, cross-sectional view 200 of a turbocharger 201 of a vehicle is shown. The turbocharger may be used similarly to turbocharger 120 of FIG. 1 and may be included as the turbocharger 120 in the system of FIG. 1, in some embodiments. In one example, the turbocharger 201 is a radial turbocharger. The turbocharger may comprise a turbine 202, including a turbine wheel schematically shown at 204, and a compressor represented schematically at 212, including a compressor wheel. The turbine wheel may be mechanically (e.g., rotationally) coupled to the compressor wheel via a shaft 222 extending parallel to a central axis 299 of the turbocharger. Exhaust gases from an engine of the vehicle (e.g., engine 104 of FIG. 1) may enter the turbine through a turbine inlet (e.g., via a volute, a portion of which is shown at 207) and exit the turbine via a turbine outlet. The volute shape of the exhaust gas inlet may distribute the exhaust gas, in a 360° manner, around the turbine wheel. Prior to exiting the turbine, the exhaust gases may rotate the turbine wheel, the energy of which may be transferred along the shaft 222 and to the compressor wheel. The compressor wheel may compress intake air entering the compressor via a compressor inlet, diffuser, and volute such that compressed air exits the compressor via a compressor outlet.

The turbocharger may comprise one or more bearings, including bearing 224, shaped to allow the shaft to extend therethrough. The bearing(s) may be further shaped to circumferentially surround at least a portion of the shaft. Lubricant may flow into the bearing so that the shaft may be lubricated as it rotates, thereby decreasing mechanical wear experienced by the shaft. In one example, the bearing is a cartridge journal bearing which may comprise a tapered pad and/or tri-load configuration. Herein, the bearing 224 is referred to as journal bearing.

The turbocharger may further comprise one or more thrust bearings. For example, a bearing 225 may be arranged at an end of the shaft, adjacent to the compressor wheel, and may include a thrust bearing. Thus, the thrust bearing may be arranged between the journal bearing and the compressor wheel, along the central axis 299. The thrust bearing may be shaped to support an axial load while also providing lubrication to an interface between the shaft and the compressor wheel. The thrust bearing may be arranged outside of the journal bearing, adjacent to a compressor end of the bearing case (e.g., closer to the compressor case than the turbine case). In some examples, the thrust bearing may at least partially surround a portion of the journal bearing. An additional bearing 227 may be positioned at an opposing end of the shaft from the compressor wheel, adjacent to or near the turbine wheel (e.g., positioned between the journal bearing 224 and the above-described thrust bearing that is positioned at a compressor wheel-end of the shaft 222).

The turbine may further comprise a plurality of vanes 210 arranged adjacent to and surrounding the turbine wheel, around an entire circumference of the turbine wheel, along a nozzle ring 208. Together, the nozzle ring 208 and plurality of vanes 210 may form a nozzle of the turbine (e.g., turbine nozzle), adapted to guide exhaust flow to the turbine wheel 204. The plurality of vanes 210 may be printed onto the nozzle ring 208 in some examples. Additionally or alternatively, the plurality of vanes may be assembled from a mold. In some examples, the plurality of vanes may be fixed and stationary. For example, each vane may be stationary and not move (e.g., pivot, rotate, or translate) relative to the nozzle ring and a central axis of the turbine wheel. Additionally, the plurality of vanes, inside the turbine, may be free of electrical, mechanical, pneumatic, hydraulic, and other types of actuators. In such examples, the plurality of vanes may be free of moving parts, such as a sliding wall, slotted shroud, or other devices configured to adjust the turbine housing geometry. In one example, the vanes may be fixed relative to the nozzle ring such that when the ring rotates the vanes remain stationary. Additionally or alternatively, the vanes may rotate with a rotation of the nozzle ring, but may not rotate independent of the nozzle ring.

The plurality of vanes may be arranged around an entire circumference of the nozzle ring, between the turbine wheel and the exhaust gas inlet. The plurality of vanes may be shaped to adjust a geometry of the turbine based on one or more engine conditions, such as an engine power level. The plurality of vanes may be shaped to inject air through one or more ports 211, which may create a boundary layer of air. The boundary layer of air may reduce an effective throat area of the nozzle, which may adjust an operating point of the turbocharger. In one example, the boundary layer of air adjusts a geometry of the turbine housing to accelerate exhaust gas as the exhaust gas flows between the boundary layer and the turbine blades, making the turbine blades spin faster than the turbine blades would spin otherwise. This may be desired when a current level of exhaust gas production is insufficient (e.g., below a threshold) to meet a current boost demand, such as during a lower engine power level. A single piece turbocharger case 205 may house (e.g., encapsulate) the turbine 202 and the bearing 224 without the presence of separate turbine and bearing cases. The turbocharger case 205 may abut a compressor case housing the turbocharger compressor. In this way, a radial split may be present between the compressor and bearing case resulting in two cases in total for the assembly.

The turbocharger case 205 may be 3D-printed as a single, monolithic structure without any joints and/or seams. The turbocharger case 205 may include (without any physical boundary therebetween) a turbine region covering the turbine 202 and a bearing region covering the bearing 224 and the shaft 222. A thermal isolation layer (barrier) may be shaped and/or configured to mitigate heat transfer from the turbine to the bearing. One location in which the thermal isolation layer may be arranged is behind the turbine wheel, between the turbine wheel and the bearing such as at a virtual boundary of the turbine region and the bearing region on the turbocharger case 205. The thermal isolation layer is described in more detail in relation to FIG. 4B.

The nozzle ring 208 may be printed onto the turbocharger case at the virtual boundary between the turbine region and the bearing region. The nozzle ring 208 may be attached to and/or may be integrated with the turbocharger case 205 at one end (at the end proximal to the turbocharger) and free standing on an opposing end of the nozzle ring. In this way, during operation of the turbocharger, the free end of the nozzle ring may expand to mitigate build-up of thermal stress, thereby maintaining structural integrity.

A targeted water cooling system with fluidic passages 218 may be integrated into the case 205 to provide cooling to areas of the case such as the virtual boundary of the turbine region and the bearing region that may be exposed to temperature gradients during turbocharger operation. In one example, a single fluidic passage 218 shaped like a helix with an inlet/outlet 220, the coils of the helix may pass through a plurality of cut-outs in the case 205 such that a larger surface area of the turbocharger 201 and the case 205 is cooled by the fluid flowing through the passage 218. By forming a plurality of cut-outs on the case 205, the passage of the cooling system may be well integrated and distributed over the entirety of the case 205. The helix of the cooling system may be radially symmetric around the central axis 299 with two or more coils (passages) integrated into the case 205. By distributing the cooling passage over the entire case, a uniform cooling of the case may be ensured, thereby decreasing thermal stress between parts of the case caused due to a temperature gradient and unequal thermal expansion during operation of the turbocharger. In some examples, portions of the turbocharger may be non-actively cooled, meaning cooled only through thermal conductivity with contacting parts or natural air convection, and not through water cooling or other forced convection.

An example cooling core 300 is shown in FIG. 3. The cooling core may include a single fluidic passage shaped as a helix with a first end 302, a first coil 308 and a second coil 306, and a second end 304. The first end 302 and the second end 304 of the cooling core 300 may have rectangular or square cross-sections. The first coil 308 and the second coil 306 may pass through an interior of the case and at least partially envelop turbocharger components such as the turbine wheel and the bearing. In this way, the cooling core may include a curved or helical portion that approximately encircles at least a portion of the shaft of the turbocharger, for example. As used herein, approximately encircling may include surrounding all or most of the shaft or other component at a given point, such as encircling 90% or more of the circumference of the shaft at a given point or plane. Due to the helical nature of the cooling core, the encircling may be angled, such that a start point of the circle is positioned vertically above or below a stop point of the circle.

In some examples, fluid may enter the cooling core though the first end 302 and after circulating through each of the first coil 308 and the second coil 306 may exit the cooling core through the second end 304. In other examples, fluid may travel in the opposite direction, entering the cooling core through the second end 304 and, after circulating through each of the second coil 306 and the first coil 308, exiting the cooling core through the first end 302. Directionality of fluid through the cooling core may be static or dynamically controlled (e.g., based on an operating status of the vehicle, a temperature of the turbocharger and/or other components in a coolant circuit that includes the cooling core 300, an operating schedule for the coolant circuit including the cooling core 300, and/or other vehicle parameters). For example, while the turbocharger components are above a threshold temperature at which the components are to be cooled, coolant flow through the cooling core 300 may be controlled to direct the coolant from the cooling core 300 to one or more other vehicle components that benefit from heated coolant and/or to a coolant component that is configured to dissipate excess heat from the coolant (e.g., a radiator or other heat transfer device). In another example, while the turbocharger components are below a threshold temperature at which the turbocharger components are not to be cooled, coolant flow through the cooling core 300 may be controlled to direct the coolant from the cooling core 300 to one or more other vehicle components that benefit from cooled coolant and/or to a coolant component that is configured to heat up the coolant (e.g., a heater).

The first coil 308 and the second coil 306 may be co-axial. The first coil 308 may have a rectangular cross section where outer walls 314 and inner walls 316 of the cooling core are broader than the narrower upper walls 318 and lower walls (opposite the upper walls 318) of the cooling core. The portion of the cooling core connecting the first coil 308 to the second coil 306 may be twisted relative to the first coil 308 to form a helical shape. The second coil 306 may have a different shape and/or orientation than the first coil 308. For example, the second coil 306 may have a rectangular, trapezoidal, or triangular cross section with a flattened top wall, and at least one side wall (e.g., outer wall 314, which faces an outer region of the cooling core and/or faces away from turbocharger components being cooled by the cooling coil) that is angled such that a bottom of the side wall is further from a center of the second coil 306 than a top of the side wall. The flattened shape of the second coil 306 may allow the second coil 306 to more closely conform to the surface of the turbine.

The inner wall in the region of the first coil 308 and/or the second coil 306 may include a plurality of ribs 312 (e.g., indentations or grooves that project into an interior of the coolant passage formed by the first coil 308). The ribs 312 formed on each coil may extend along at least a portion of the inner wall 316 in the region of the respective coil(s), the ribs 312 being mutually parallel. By including the ribs 312, the surface area of the walls of the coils 308, 306 in contact with turbocharger components may be increased. Inclusion of the ribs 312 may improve the interface between the cooling core 300 and the bearings with the ribs 312 accommodating the bearings and providing effective cooling to the bearings. In this way, the ribs 312 may facilitate heat transfer, and as such may be configured to optimize heat transfer. For example, the space between adjacent ribs and the height of the ribs may be selected to provide a desired amount of heat transfer. In one non-limiting example, adjacent ribs may be spaced apart by a distance (such as 10 mm or 20 mm) that is equal to a height (e.g., 10 mm or 20 mm) of each rib, and each rib may have a width that is less than half the height of each rib (e.g., 3 mm or 7 mm). While ribs are described herein, it is to be understand that other heat transferring structures may be used in addition or alternative to the ribs, such as fins, vanes, or other protuberances.

The cooling core 300 may be an example of coolant passage 218 of FIG. 2 and may be positioned relative to turbocharger components as shown therein. During turbocharger operation, heat from the turbine wheel may be transferred to a coolant such as water flowing through the cooling core, thereby actively cooling the turbine wheel. Due to the heat adsorption, the water exiting the cooling core may be at a higher temperature relative to the water entering the cooling core. In one example, the amount of water (rate of flow of water) circulated through the cooling core may be adjusted via adjusting positions of one or more valves of a flow control system arranged upstream of the first end. As an example, the amount of water circulated may be increased with an increase in turbocharger speed while the amount of water circulated may be decreased with a decrease in turbocharger speed. Also, the rate of flow of water through the cooling core based on a temperature gradient between the turbine and the bearing, the rate increased with an increase in the temperature gradient and the rate decreased with a decrease in the temperature gradient.

Returning to FIG. 2, in examples where the turbocharger is a fluidic VGT wherein the vanes 210 on the nozzle ring 208 are stationary and direct various amounts of air into the turbine nozzle to adjust a throat area of the nozzle through fluidic blocking, a conduit (passage) 216 may be formed in the case 205 via which air may flow to the vanes 210. The conduit 216 may be a hollow tube with a circular cross-section positioned within the case. The conduit 216 may be radially symmetric around the central axis 299 and may be positioned adjacent to the vanes 210 on the nozzle ring 208. The conduit 216 may include an air inlet and an air outlet via which air may be routed to the vanes. Air flow from an air flow control system to the one or more vanes via the conduit 216 may be adjusted based on engine power level. As an example, the air flow may be decreased with an increase in engine power level while the air flow may be increased with a decrease in engine power level. As disclosed herein, the air flow from the air flow control system may include atmospheric air, other fluidic sources (e.g., other gasses), and/or a mixture of fluidic sources.

The case 205 may further include passageways 231, which may be configured to direct oil or other lubricants to the bearing 224 and/or shaft 222. The passageways 231 may be formed similarly to the coolant passages 218 as open spaces within the case 205 adjacent to solid material of the case 205. The passageways 231 may have fluidic access to the shaft 222 and/or bearing 224 in order to deliver the lubricant thereto. At an opposite end of the passageways 231 from the fluid access points, the passageways may be coupled to an oil or other lubricant source, either directly or via additional passageways outside of the case 205.

At least certain portions 232a-c of the case 205 may be constructed with a lattice structure to provide increased strength and structural integrity to the case 205. Since the case 205 is a single structure enclosing the entire turbine and bearing, the incorporation of portions with a lattice pattern may reduce the overall weight of the case compared to completely solid configurations while improving the strength compared to configurations that include open cavities. The lattice structured portions may be distributed symmetrically around the central axis 299 in selected regions of the case 205 while the remaining part of the case 205 may be a solid structure. In some examples, the size, shape, position, etc., of the lattice may be selected based on allowed stress to increase structural strength while reducing a weight of the case. In an embodiment, the lattice structure and/or lattice portion is defined at the macro, non-atomic level to include an array or arrays of interconnected material with dispersed or distributed voids or spaces, i.e., regions lacking material. For example, the largest cross-dimensions of the voids or spaces, which may be the same or different from one another, may be at least 0.5 mm, or at least 1.0 mm (e.g., from 0.5 mm to 1.0 mm, or from 0.5 mm to 1.0 cm, or from 1.0 mm to 1.0 cm), such that at least some adjacent sections of material are spaced apart from one another by such an amount, with either no material therebetween or a different material therebetween.

In one example, first lattice portions 232a may be positioned adjacent or near to a compressor wheel and/or a compressor case housing the compressor represented at 212. The first lattice portions 232a may be cross-sections of a continuous or semi-continuous ring around the central axis 299. The dimension (shape, size, and/or diameter) of the continuous ring may vary along the length and/or circumference of the ring to accommodate the turbocharger components (such as the upper portion of the shaft 222) placed in the region. The first lattice portions 232a may be polygonal with one side (adjacent to the compressor case) elongated relative to the other sides. The first lattice portions 232a may extend substantially between an outer wall of the case 205 and an upper region of the shaft 222.

Second lattice portions 232b may be positioned around the shaft 222 and/or adjacent to the bearing 224. The second lattice portions 232b may be cross-sections of a continuous or semi-continuous ring around the shaft 222. The second lattice portions may be pentagonal structures with dimensions varying along the length/circumference of the ring according to the adjoining turbocharger components (such as the shaft 222 and the bearing 224). The second lattice portions 232b may extend between the shaft 222 and the passageway 231 (e.g., in a triangular region formed between the shaft 222 and two trunks of the passageway 231: a trunk leading to an upper bearing near the compressor 212 and a trunk leading to the bearing 224) in at least one region of the case 205.

Third lattice portions 232c may be positioned adjacent to or near the nozzle ring 208 and/or the turbine wheel 204. Accordingly, as shown, the first, second, and third lattice portions are arranged at different radial locations of the case. The first lattice portions 232a may be closest to the compressor (e.g., closer to the compressor than the second and third lattice portions), the third lattice portions 232c may be closest to the turbine (e.g., closer to the turbine than the first and second lattice portions), and the second lattice portions 232b may be positioned between the first and second lattice portions along the central axis 299. The third lattice portions 232c may be cross-sections of a continuous or semi-continuous ring around the central axis 299 (e.g., around the shaft 222 and around the coolant passages 218. The dimension (shape, size, diameter) of the continuous ring may vary along the length and/or circumference of the ring to accommodate the turbocharger components (such as the fluidic passages 218 of the cooling core) placed in the region. The third lattice portions 232c may extend substantially between the outer wall of the case 205 and the shaft 222 (e.g., between the outer wall of the case and a trunk of the passageway 231 leading to a lower bearing near the turbine/ nozzle ring). At least a portion of the third lattice portions 232c may be shaped in a complementary manner to a portion of conduit 216.

The third lattice portions 232c may be at least partially aligned with or intersect a central axis of the first lattice portions 232a (e.g., in a direction along the axis of rotation of the shaft 222, which may be coaxial with central axis 299), while the second lattice portions 232b may be positioned closer to the axis of rotation of the shaft 222 than the first and second lattice portions. The first and second lattice portions may only be separated from the shaft 222 and/or an associated bearing (e.g., bearing 225 or bearing 224, respectively) via solid material of the turbocharger case, while the third lattice portion may be separated from the shaft and/or an associated bearing (e.g., bearing 227) via solid material of the turbocharger case and other structures of the turbocharger case (e.g., oil passageway 231 and coolant passages 218). As used herein, description of a first element or region as being "adjacent to" another element or region may be understood to include examples where the two elements/ regions are in direct, face-sharing contact as well as examples where the two elements/regions are only separated by solid material of the turbocharger case.

FIG. 4A shows a lattice structure 400 which may constitute at least certain portions of a turbocharger case, such as portions 232a-c of FIG. 2. The lattice structure 400 forms a three-dimensional (3D) grid or matrix of parallel and intersecting lines of material. The material of the macro lattice may be uniform in size, shape, spacing, and/or distribution throughout the entire structure in some examples. In other examples, the material of the macro lattice may be non-uniform in size, shape, spacing, and/or distribution in at least a portion of the structure or throughout the entire structure. As used herein, the term "grid" or "matrix" may be understood to include a structure of solid lines of material that are uniform or non-uniform in size, uniform or non-uniform in shape, uniform or non-uniform in spacing, and/or uniform or non-uniform in distribution throughout the structure.

A plurality of horizontal lines 432 may intersect with vertical lines 434 at nodes 436 to form the grid. In some examples, lines of material forming the grid of the lattice structure may be equally spaced, thereby providing a uniform macro structure of pores. In other examples, the lines of material forming the grid of the lattice structure may be non-equally spaced, thereby providing a non-uniform macro structure of pores. The lines may be 3D printed with a material, such as nickel or stainless steel alloys, carbon steel based alloys, or other material, which material may also be used for manufacturing the case. The pores may contain air, fluids, or polymers to dampen vibration or add rigidity while minimizing material usage, cost, and so forth. Due to the 3D structure of the lattice, the structural integrity and strength may be higher than a solid structure even though the overall weight may be lower. Also, the interconnected grid allows effective heat transfer through the lattice structure. In this way, by fabricating portion of the case with a lattice structure, the overall weight of the case may be reduced while improving strength and heat transfer.

Accordingly, as described in more detail below, the case 205 may be manufactured using an additive manufacturing process such as 3D printing. By utilizing additive manufacturing, the complex case structure including portions of solid material, portions of intermittent solid material (e.g., forming a lattice structure), and open regions (e.g., forming openings for oil passageways and coolant passages, as well as openings for turbocharger components) may be manufactured in a fast and low-cost manner, without requiring multiple individual structures that are welded or otherwise fastened together, which may compromise structural integrity. Further, some parameters of the case structure, such as material thickness and/or spacing of material in the lattice regions, as well as the overall dimensions of the case, may be selected based on application-specific parameters. The use of additive manufacturing, as described herein, may accommodate such application-specific adjustments by adjusting the model of the case used as instructions for the additive manufacturing, and without requiring completely different manufacturing equipment.

Figure 5:
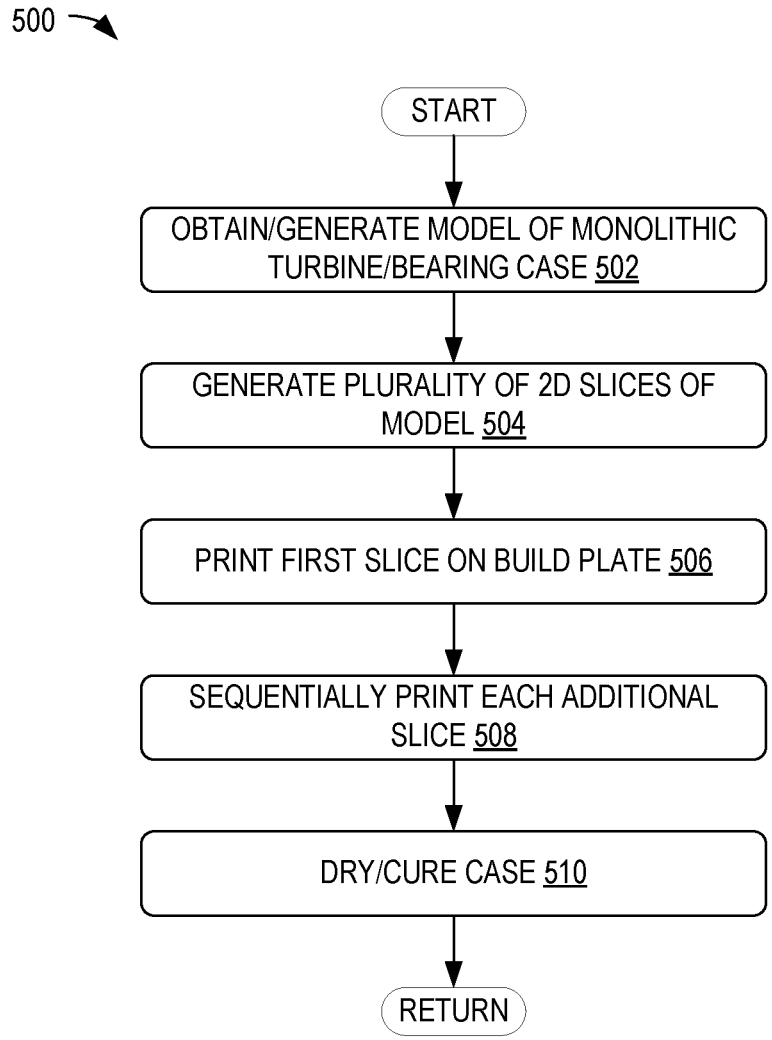
FIG. 5 shows a flowchart illustrating an example method for manufacturing a combined turbine and bearing case.

An example method 500 for 3D printing a turbocharger case, such as case 205 of FIG. 2, is illustrated in FIG. 5. At 502, the method includes obtaining or generating a 3D model of the case (e.g., the monolithic turbine and bearing case). The model of the case may be a computer aided design (CAD) file, additive manufacturing file (AMF), or other 3D modeling file. The 3D model of the case may be generated on a printer-interfacing computing device. In some examples, the 3D model may be generated entirely from operator instructions via the CAD or other program. In other embodiments, the 3D model may be generated at least in part from information received from a 3D scanner (e.g., a laser scanner) that may image a physical model of the case. The 3D model may define the dimensions of the case, exterior and interior structures of the case, and material properties of the case, thereby fully representing, in a digital format, the final form of the case that will be produced. As appreciated by FIGS. 2 and 4B (described in more detail below), for example, the case includes voids (e.g., empty space) and thus the 3D model of the case may include support structures, fill material, or other features that allow for printing over the voids. The 3D model may include the base portion of the case and/or the interior filter in order to produce a case that includes the base portion and/or interior filter integrated with the meshwork of the case. In other embodiments, the base portion and/or interior filter may be manufactured separately from the meshwork of the case, and thus may not be included in the 3D model.

At 504, the method includes generating a plurality of 2D slices of the 3D model of the case. The slices may be generated on the printer-interfacing computing device and then the plurality of slices are sent to the printing device as an STL file, or the 3D model of the case may be sent to the printing device, and the printing device may slice the 3D model into the plurality of slices to generate an STL file. In doing so, the 3D model may be sliced into hundreds or thousands of horizontal layers of a suitable thickness, such as a thickness in a range from 0.1 mm to 3 mm. The total number of layers or slices may be based on a thickness of the case, a material used for the printing, and/or user selection. At 506, the method includes printing, with the printing device, the first slice on a build plate or other suitable base material. When the printing device prints from the STL file, the printing device creates or prints the case layer-by-layer on the build plate. Accordingly, at 508, the method includes sequentially printing each additional slice of the 3D model. For example, the printing device may read every slice (or 2D image) from the 3D model and proceed to create the 3D case by laying down (or printing) successive layers of material on an upper, planar surface of the build plate until the entire case is created. Each of these layers can be seen as a thinly sliced horizontal cross section of the eventually completed or printed 3D case.

The printing device may be a suitable device configured to print metal and/or other high magnetic permeability materials, such as aluminum or stainless steel. The printing device may utilize selective laser melting (SLM) technology, direct metal laser sintering (DMLS) technology, or other suitable metal printing technology. In some examples, the printing device may be configured to print multiple materials (e.g., the material for the case and fill material for voids of the case; and/or material for different regions of the case) and thus may include more than one print head.

During printing, the print head(s) is moved, in both horizontal and vertical directions, to complete or print each layer of the 3D model, by a controlled mechanism that is operated by control software running on the printing device, e.g., a computer-aided manufacturing (CAM) software package adapted for use with the printing device. The build plate is typically stationary with its upper planar surface parallel to a horizontal plane, although in some examples the build plate may be moved up and down vertically (i.e., in the z-direction). The printed material solidifies to form a layer (and to seal together layers of the 3D case), and the print head or build plate is then moved vertically prior to starting the printing of the next layer. This process is repeated until all layers of the 3D case have been printed.

At 510, the method includes drying and/or curing the case. For example, the printing process may include one or more drying and/or curing stages, which may include drying and/or curing each layer after the respective layer is printed and/or drying and/or curing the printed case after all layers are printed. The printed material may be cured by exposure to heat or UV radiation and allowed to harden (e.g., fully or partially). After drying/curing, any fill material used may be removed. For example, if a fill material is printed in the voids, the case may be placed into water, acid, or other solvent to dissolve the fill material. In another example, if support structures are printed in the voids (e.g., scaffolding-like structures or perforated structures), the support structures may be removed manually and/or with a tool. In some examples, the entire case may be printed as a single component, while in other examples, the 3D model of the case may include multiple 3D models, each of a different section of the case.

The method 500 provides an example for manufacturing the monolithic turbine and bearing case of the present disclosure using additive manufacturing technology, such as 3D printing. In an example, the monolithic turbine and bearing case described herein may be manufactured according to a computer readable medium including computer readable instructions which, when executed on a 3D printer or associated computing device, cause the printer to print the monolithic turbine and bearing case. It is to be understood that the example additive manufacturing process described in FIG. 5 is just one example of manufacturing the monolithic case of the present disclosure, and other manufacturing processes may be used in addition to or as an alternative to the method 500. For example, all or a portion of the monolithic case of the present disclosure may be manufacturing using a mold. The mold may be generated by first 3D printing a model of the case in a suitable material that may be solid at room temperature but changes to liquid at a relatively low temperature that is greater than room temperature, such as wax. A plaster mold may be formed over the wax model, and after the plaster dries, the wax may be melted and drained from the mold. The mold may then be filled with molten metal. Once the metal cools, the plaster may be removed to generate the monolithic case. As another example, the monolithic case may be manufactured using subtractive manufacturing technology. For example, as described briefly above, one or more lasers or other etching or subtractive mechanisms may be controlled by a computing device to selectively melt or otherwise remove material from a base structure in order to form a case having the overall dimensions and interior features of the monolithic turbine and bearing case described herein (e.g., based on a 3D model of the case, generated as described above). As still another example, the case may be formed by stack lamination, in which different layers of the case are formed independently by a process such as photolithography, and the layers are stacked and laminated to fuse the layers together. It is to be understood that any combination of 3D manufacturing techniques may be combined to produce the monolithic turbine and bearing case of the present disclosure.

As discussed above, the 3D printing process may utilize one or more materials for building the structure of the case and/or for building optional support structures within the case. For example, the material used to build the structure of the case may have different (e.g., higher) thermal properties (e.g., melting point) and/or other parameters (e.g., strength, rigidity, etc.) than the material used to build support structures in order to allow the support structures to be removed from the case. Furthermore, different regions of the case may be manufactured using different materials. For example, some regions of the case may be manufactured using material with higher elasticity/flexibility than other regions, higher porosity than other regions, higher density/strength than other regions, etc. In other examples, the entire case may be printed using the same material. As described above, examples of materials used for manufacturing the case include metal and/or other high magnetic permeability materials, such as aluminum, nickel alloys, or stainless steel. In other examples, materials used for manufacturing the case may include carbon steel based alloys.

Turning to FIG. 4B, a second, partial cross-sectional view 420 of the turbocharger 201 of FIG. 2 is illustrated (e.g., where the cross-section depicted in FIG. 4B is at a different depth of the turbocharger case 205 than the cross-section depicted in FIG. 2). Components of the turbocharger 201, as shown in FIG. 2, are numbered similarly and not reintroduced. A thermal isolation layer 414 may be positioned between a turbine wheel 204 and a bearing 224 such as at the virtual boundary of the turbine region and the bearing region on the turbocharger case 205. The thermal isolation layer may reduce heat flow between the turbine wheel 204 (which it at a higher temperature during turbocharger operation) and the bearing 224. Due to the reduced heat flow, a thermal gradient may not form at the boundary of the turbine region and the bearing region on the turbocharger case 205, thereby reducing thermal stress and mechanical wear.

As shown in the inset 430, as seen in greater detail in FIG. 4C, the thermal isolation layer 414 may include a plurality of holes 416. Adjacent holes may be evenly spaced from one another along a length of the thermal isolation layer and/or evenly radially spaced away from the shaft and/or the central axis of the turbocharger. The holes may be positioned adjacent a region of lattice material in the case 205. The holes may form concentric rings of voids in a material of the case 205 around the shaft 222. The holes may contain air in some examples. In other examples, the holes may be fluidly coupled to a coolant source and configured to flow a coolant therethrough, such as water. In such examples, the holes may form a spiral pattern rather than separate concentric rings.

A plurality of cut-outs 418 may be formed in the case 205 to allow the passages of the water cooling system to pass. The water cooling system provides cooling to the turbine wheel 204 and the bearing 224 to further reduce the temperature gradient and the thermal stress on parts of the case 205. The cut-outs may be of different shapes and sizes to accommodate the geometry of the cooling system passage passing therethrough. The holes of the thermal isolation layer 414 may extend between a conduit 216 and the cut-outs 418 across a diameter of the case 205 and may encircle the shaft 222.

In this way, the components of FIGS. 1-4C provide for a system comprising: turbocharger including a turbine, a compressor, a shaft coupling the turbine and compressor, and at least a bearing adjacent to the shaft, a seamless turbocharger case enclosing each of the turbine, the shaft, and the bearing; a targeted water cooling system integrated into the case to cool an interface of the turbine, the bearing, and the case; and a thermal isolation barrier positioned at the interface.

An example provides for an apparatus for an engine, including an integrated, monolithic turbocharger case that houses each of a turbine of a turbocharger and a bearing of the turbocharger, the turbocharger case having a thickness and one or more regions of the turbocharger case within the thickness defining a lattice structure; and a nozzle ring integrated into the turbocharger case and located between the turbine and the bearing. In a first example of the apparatus, the turbocharger case is a three-dimensional (3D) printed structure without any joints or seams, the turbocharger case abutting a compressor case that houses a compressor of the turbocharger. In a second example of the apparatus, which optionally includes the first example, the turbocharger case is adapted to receive a shaft that couples the turbine to the compressor, and the bearing is positioned adjacent to the shaft. In a third example of the apparatus, which optionally includes one or both of the first and second examples, the turbocharger case has an inner surface that defines a cooling core, and thereby to facilitate a cooling fluid flowing through the cooling core to cool an interface between the turbine and the bearing. In a fourth example of the apparatus, which optionally includes one or more or each of the first through third examples, the cooling core is defined at least in part by a hollow passage and includes an inlet tube, an outlet tube, and a curved or helical portion that approximately encircles at least a portion of the shaft. In a fifth example of the apparatus, which optionally includes one or more or each of the first through fourth examples, at least one coil is co-axial and has a rectangular cross section and defines one or more ribs or vanes or protuberances on an inner wall portion. In a sixth example of the apparatus, which optionally includes one or more or each of the first through fifth examples, at least one coil is co-axial and has a trapezoidal cross section. In a seventh example of the apparatus, which optionally includes one or more or each of the first through sixth examples, the apparatus further includes a thermal isolation barrier that is at least partially positioned between a turbine wheel of the turbine and the bearing. In an eighth example of the apparatus, which optionally includes one or more or each of the first through seventh examples, the nozzle ring includes one or more stationary vanes, and at least one vane defines one or more injection ports. In a ninth example of the apparatus, which optionally includes one or more or each of the first through eighth examples, the turbocharger case defines a conduit configured to route gas from an air supply system to at least one injection port. In a tenth example of the apparatus, which optionally includes one or more or each of the first through ninth examples, the lattice structure includes a 3D grid of parallel and intersecting lines of material forming open pores, and wherein the one or more regions formed of a lattice structure includes a first region adjacent to a compressor wheel of the turbocharger, a second region adjacent to the nozzle ring, and a third region between the first and second regions along a central axis of rotation of a shaft coupling the compressor wheel to the turbine wheel. In an eleventh example of the apparatus, which optionally includes one or more or each of the first through tenth examples, the lattice structure extends to at least partially encircle a central axis of rotation of a shaft of the turbocharger.

Another example provides for a system, including: a turbocharger including a turbine, a compressor, a shaft coupling the turbine and compressor, and at least one bearing adjacent to the shaft; a seamless turbocharger case housing each of the turbine, the shaft, and the at least one bearing; a targeted water cooling system integrated into the case to cool an interface of the turbine, the at least one bearing, and the case; and a thermal isolation barrier integrated into the case and positioned at the interface. In a first example of the system, the targeted water cooling system includes a continuous cooling passage passing through cut-outs formed on a wall of the case, the cooling passage radially symmetric around a central axis of the turbocharger. In a second example of the system, which optionally includes the first example, the cooling passage includes an inlet tube, one or more coils, and an outlet tube, wherein the cooling passage is configured to direct a coolant entering the inlet tube to exit the outlet tube after flowing through the one or more coils. In a third example of the system, which optionally includes one or both of the first and second examples, the thermal isolation layer includes a plurality of holes forming concentric rings of voids in a material of the case around the shaft of the turbocharger. In a fourth example of the system, which optionally includes one or more or each of the first through third examples, the system further includes a printed-in nozzle ring incorporated between the turbine and the bearing.

A further example provides for a turbocharger case housing a turbine and a bearing of a turbocharger of an engine system, the turbocharger case including one or more lattice structured portions distributed around a central axis of the turbocharger; one or more cut-outs on a wall of the turbocharger case having a complementary shape to a cooling core disposed in the turbocharger case; and a conduit to route air to one or more vanes positioned on a nozzle ring integrated in the turbocharger case. In a first example of the turbocharger case, the turbocharger case further includes an oil passageway coupled between an oil supply of the engine system and the bearing of the turbocharger. In a second example of the turbocharger case, which optionally includes the first example, the one or more lattice structured portions include a first lattice structured portion disposed adjacent to a compressor wheel of the turbocharger, a second lattice structured portion disposed between the bearing and a portion of the oil passageway, and/or a third lattice structure portion disposed adjacent to the nozzle ring.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An apparatus for an engine, comprising:
   an integrated, monolithic turbocharger case that houses each of a turbine of a turbocharger and a bearing of the turbocharger, the turbocharger case having one or more regions being formed as a lattice structure, the turbocharger case being a single structure entirely enclosing the turbine and bearing;
   a nozzle ring that is integrated into the turbocharger case and located between the turbine and the bearing; and
   a turbine wheel, wherein the one or more regions, which are being formed as the lattice structure, include a first region positioned adjacent to a compressor, a second region positioned around a shaft of the turbocharger, and a third region positioned adjacent to the nozzle ring and the turbine wheel, and between a central axis of the turbine and an outer radial edge of the turbine wheel, wherein the turbocharger case further comprising a targeted water cooling system, the targeted water cooling system including a continuous cooling passage passing through cut-outs formed on a wall of the turbocharger case, the continuous cooling passage being radially symmetric around the central axis of the turbine.

2. The apparatus of claim 1, wherein the turbocharger case is a three-dimensional (3D) printed structure without any joints or seams, the turbocharger case abutting a compressor case that houses a compressor of the turbocharger, wherein the third region extends substantially between an outer wall of the turbocharger case and the shaft of the turbocharger.

3. The apparatus of claim 2, wherein the turbocharger case is adapted to receive the shaft of the turbocharger, and the bearing is positioned adjacent to the shaft of the turbocharger.

4. The apparatus of claim 3, wherein the turbocharger case has an inner surface that defines a cooling core, and thereby to facilitate a cooling fluid flowing through the cooling core to cool an interface between the turbine and the bearing.

5. The apparatus of claim 4, wherein the cooling core is defined at least in part by a hollow passage and includes an inlet tube, an outlet tube, and a curved or helical portion that approximately encircles at least a portion of the shaft of the turbocharger.

6. The apparatus of claim 5, wherein the curved or helical portion of the cooling core includes at least one coil, wherein the at least one coil has a rectangular cross section and includes one or more ribs or vanes or protuberances on an inner wall portion of the cooling core.

7. The apparatus of claim 5, wherein the curved or helical portion of the cooling core includes at least one coil, and wherein the at least one coil has a trapezoidal cross section.

8. The apparatus of claim 1, further comprising a thermal isolation barrier that is at least partially positioned between the turbine wheel of the turbine and the bearing.

9. The apparatus of claim 1, wherein the nozzle ring includes one or more stationary vanes, and wherein at least one vane of the one or more stationary vanes defines one or more injection ports.

10. The apparatus of claim 9, wherein the turbocharger case defines a conduit configured to route a gas from an aft supply system to at least one of the one or more injection ports.

11. The apparatus of claim 1, wherein the lattice structure includes a 3D grid of parallel and intersecting lines of a material forming open pores, and wherein the second region is between the first and third regions along a central axis of rotation of the shaft of the turbocharger, the central axis of rotation of the shaft being coaxial with the central axis of the turbine.

12. The apparatus of claim 1, wherein the lattice structure extends to at least partially encircle a central axis of rotation of the shaft of the turbocharger, the central axis of rotation of the shaft being coaxial with the central axis of the turbine.

13. A system, comprising:
    a turbocharger including a turbine, a compressor, a shaft coupling the turbine and compressor, and at least one bearing adjacent to the shaft, the turbine including a volute;
    the turbocharger including a seamless turbocharger case housing each of the turbine, the shaft, and the at least one bearing;
    wherein the seamless turbocharger case includes a targeted water cooling system integrated into the seamless turbocharger case to cool an interface of the turbine and the at least one bearing, the seamless turbocharger case further including a lattice structured portion that is positioned at least radially between the volute and a central axis of the turbine; and a thermal isolation barrier integrated into the seamless turbocharger case and positioned at the interface, the thermal isolation barrier positioned adjacent the lattice structured portion in the seamless turbocharger case, wherein the targeted water cooling system includes a continuous cooling passage passing through cut-outs formed on a wall of the seamless turbocharger case, the continuous cooling passage being radially symmetric around the central axis of the turbine.

14. The system of claim 13, wherein the thermal isolation barrier includes a plurality of radially aligned holes positioned perpendicular to the central axis.

15. The system of claim 14, wherein the continuous cooling passage includes an inlet tube, one or more coils, and an outlet tube, wherein the continuous cooling passage is configured to direct a coolant entering the inlet tube to exit the outlet tube after flowing through the one or more coils.

16. The system of claim 13, wherein the thermal isolation barrier includes a plurality of holes forming concentric rings of voids in a material of the seamless turbocharger case around the shaft of the turbocharger.

17. The system of claim 13, further comprising a printed-in nozzle ring incorporated between the turbine and the at least one bearing.

* * * * *